(12) United States Patent
Kim

(10) Patent No.: US 7,683,985 B2
(45) Date of Patent: Mar. 23, 2010

(54) METHOD OF MANUFACTURING LIQUID CRYSTAL DISPLAY DEVICE COMPRISING A BLACK MATRIX RESIN AND BALL SPACER SOLUTION

(75) Inventor: Min Joo Kim, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 349 days.

(21) Appl. No.: 11/384,108

(22) Filed: Mar. 17, 2006

(65) Prior Publication Data

US 2006/0209235 A1    Sep. 21, 2006

(30) Foreign Application Priority Data

Mar. 18, 2005    (KR)    .................... 10-2005-0022705

(51) Int. Cl.
*G02F 1/1333*    (2006.01)
*G02F 1/1337*    (2006.01)
*G02F 1/1339*    (2006.01)

(52) U.S. Cl. .................... 349/110; 349/124; 349/155; 349/187

(58) Field of Classification Search .................. 349/110, 349/155, 156, 157, 124
See application file for complete search history.

(56) References Cited

U.S. PATENT DOCUMENTS 5,437,896 A * 8/1995 Kloosterboer et al. ....... 427/515
6,177,214 B1 * 1/2001 Yokoyama et al. ............. 430/7
6,737,289 B2 * 5/2004 Woo et al. ..................... 438/30
6,770,335 B2 * 8/2004 Shin et al. .................. 428/1.25
6,787,275 B2 * 9/2004 Kawase .......................... 430/7
7,050,130 B2 * 5/2006 Sohn et al. .................. 349/106
7,136,140 B1 * 11/2006 Inoue et al. ................. 349/191
2004/0263752 A1 * 12/2004 Kim ........................... 349/141

FOREIGN PATENT DOCUMENTS

| JP | 63113424 A * | 5/1988 |
| JP | 03-094218 | 4/1991 |
| JP | 04-014021 | 1/1992 |
| JP | 11-142861 | 5/1999 |
| JP | 11-202345 | 7/1999 |
| JP | 2001-059968 | 3/2001 |
| JP | 2002-350832 | 12/2002 |
| JP | 2003-287614 | 10/2003 |
| JP | 2004-145089 | 5/2004 |

OTHER PUBLICATIONS

Office Action issued in corresponding Japanese Patent Application No. 2006-074562; issued May 12, 2009.
Office Action issued in corresponding Japanese Patent Application No. 2006-074562; issued Nov. 10, 2009.

* cited by examiner

*Primary Examiner*—Michael H Caley
(74) *Attorney, Agent, or Firm*—Brinks Hofer Gilson & Lione

(57) ABSTRACT

A method of manufacturing a liquid crystal display (LCD) device and corresponding LCD device are disclosed. An ink-jet apparatus is provided with a solution containing a black matrix resin and ball spacers. The solution is then coated on a predetermined portion of a substrate by the ink-jet apparatus. This permits formation of both a black matrix layer and ball spacers at the same time, with the ball spacers provided in only a non-pixel area of the substrate.

13 Claims, 3 Drawing Sheets

METHOD OF MANUFACTURING LIQUID CRYSTAL DISPLAY DEVICE COMPRISING A BLACK MATRIX RESIN AND BALL SPACER SOLUTION

This application claims the benefit of the Korean Patent Application No. P2005-22705, filed on Mar. 18, 2005, which is hereby incorporated by reference as if fully set forth herein.

TECHNICAL FIELD

The present invention relates to a liquid crystal display (LCD) device, and more particularly, to ball spacers formed between two substrates of a liquid crystal display (LCD) device to maintain a cell gap therebetween.

DISCUSSION OF THE RELATED ART

Among various ultra-thin flat type display devices, which include a display screen having a thickness of several centimeters, a liquid crystal display (LCD) device can be widely used for notebook computers, monitors, aircraft, and etc. since it has advantages such as low power consumption and portability.

The LCD device includes lower and upper substrates facing each other at a predetermined interval therebetween, and a liquid crystal layer formed between the lower and upper substrates. In addition, spacers are formed between the lower and upper substrates to maintain a cell gap therebetween.

To form the sphere-shaped spacers of the related art, first, ball spacers are mixed in a solution at a predetermined density. The solution containing the ball spacers is then sprayed onto the substrate through a nozzle.

In the case of the above method of spraying the solution containing the ball spacers through the nozzle, the ball spacers may be sprayed onto pixel regions of the substrate, which is undesired. That is, the picture quality of the LCD device may be deteriorated due to the ball spacers sprayed onto the pixel regions of the LCD device. Accordingly, instead of the above method of spraying the solution containing the ball spacers through the nozzle, an ink-jet method has been recently proposed.

FIG. 1 is a perspective view of schematically showing a method for forming ball spacers by a related art ink-jet method.

As shown in FIG. 1, an ink-jet apparatus 30 is moved along in a direction (shown by the arrow) above a substrate 10 including a pixel area and a non-pixel area. During this process, ball spacers are dispensed onto the non-pixel area of the substrate 10 by the ink-jet apparatus 30.

The ink-jet apparatus 30 is comprised of an ink head for storing a solution containing the ball spacers, and a nozzle for dispensing the solution containing the ball spacers onto the substrate 10.

When the ink-jet apparatus 30 moves above the substrate 10, the solution containing the ball spacers is dispensed onto the substrate 10 through the nozzle. After completing the dispensing process, the solution dispensed on the substrate 10 dries. That is, after the solvent evaporates from the solution, only the ball spacers remain on the substrate 10.

The above method of using the ink-jet apparatus 30, the ball spacers 50 are formed in the desired portion of the substrate by controlling the nozzle. Accordingly, the ball spacers 50 can be formed on only the non-pixel area of the substrate 10, thereby preventing the deterioration of picture quality.

However, even though the ball spacers 50 are formed on the non-pixel area of the substrate 10, the ball spacers may move from the non-pixel area to the pixel area during transfer of the substrate 10.

In addition, when dispensing the solution containing the ball spacers through the nozzle, drops of the solution dispensed may collect together and thus may grow in size. In this case, the ball spacers 52 may move to the pixel area as the drops grow in size.

As shown above, even in the case of using the ink-jet apparatus, the ball spacers 52 may move to the pixel area when transferring the substrate or when dispensing the solution, thereby deteriorating the picture quality.

SUMMARY

By way of example only, in one embodiment, a method of manufacturing an LCD device comprises providing an ink-jet apparatus having a solution containing a black matrix (BM) resin and ball spacers, and coating the solution on a predetermined portion of a substrate using the ink-jet apparatus to simultaneously provide both a black matrix (BM) layer and the ball spacers on the substrate.

In another embodiment, a method of manufacturing an LCD device comprises coating a predetermined non-pixel area of a first substrate with a solution containing a black matrix (BM) resin and ball spacers, providing a second substrate opposite to the first substrate, and forming a liquid crystal layer.

In another embodiment, an LCD device comprises a first transparent substrate containing a black matrix (BM) layer in a non-pixel area, the BM layer having ball spacers dispensed therein, a second transparent substrate opposite to the first substrate, and a liquid crystal layer disposed between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method of manufacturing a liquid crystal display (LCD) device according to the present invention will be described with reference to the accompanying drawings.

Figure 1:
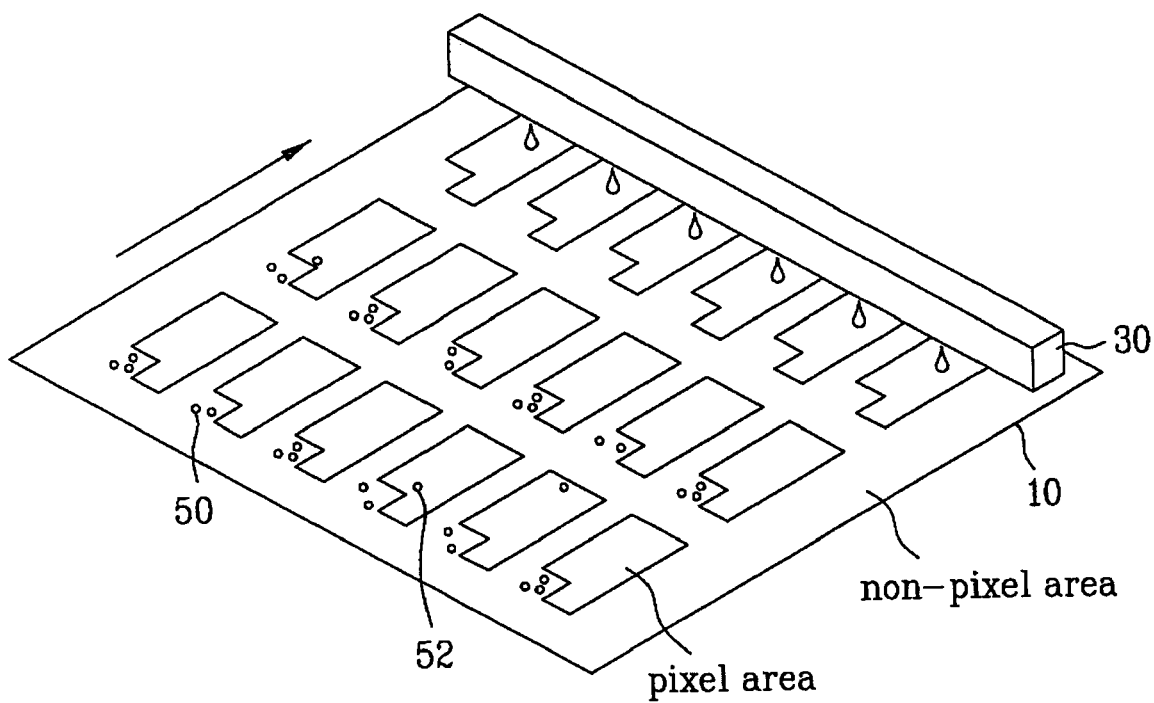
FIG. 1 is a perspective view of showing a method for forming ball spacers by a related art ink-jet method.
Figure 2A:
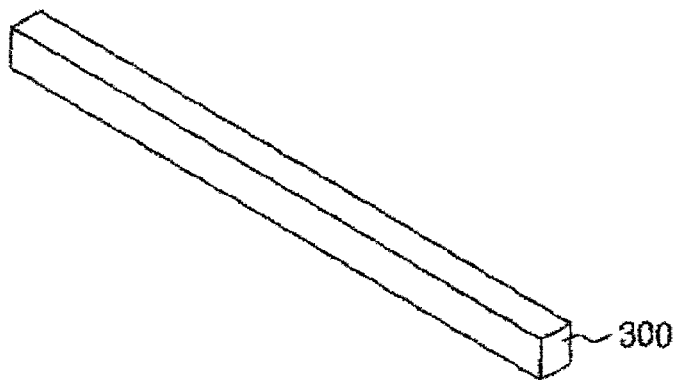
FIGS. 2A to 2C are perspective views of showing a method for forming an LCD device according the preferred embodiment of the present invention.
Figure 2B:
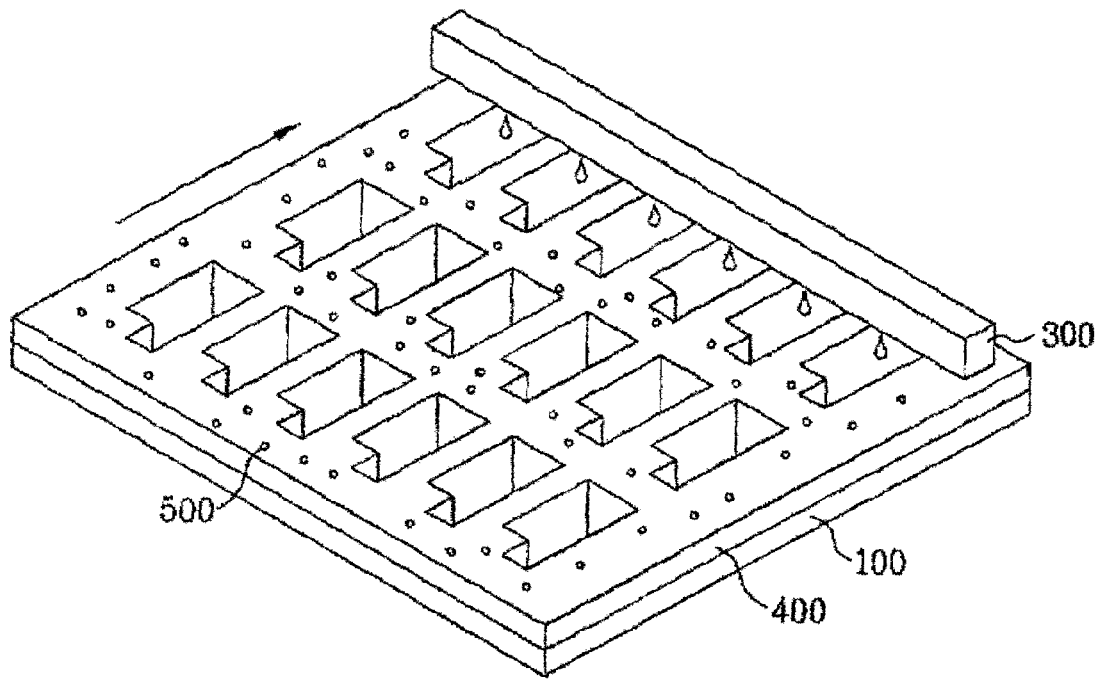
Figure 2C:
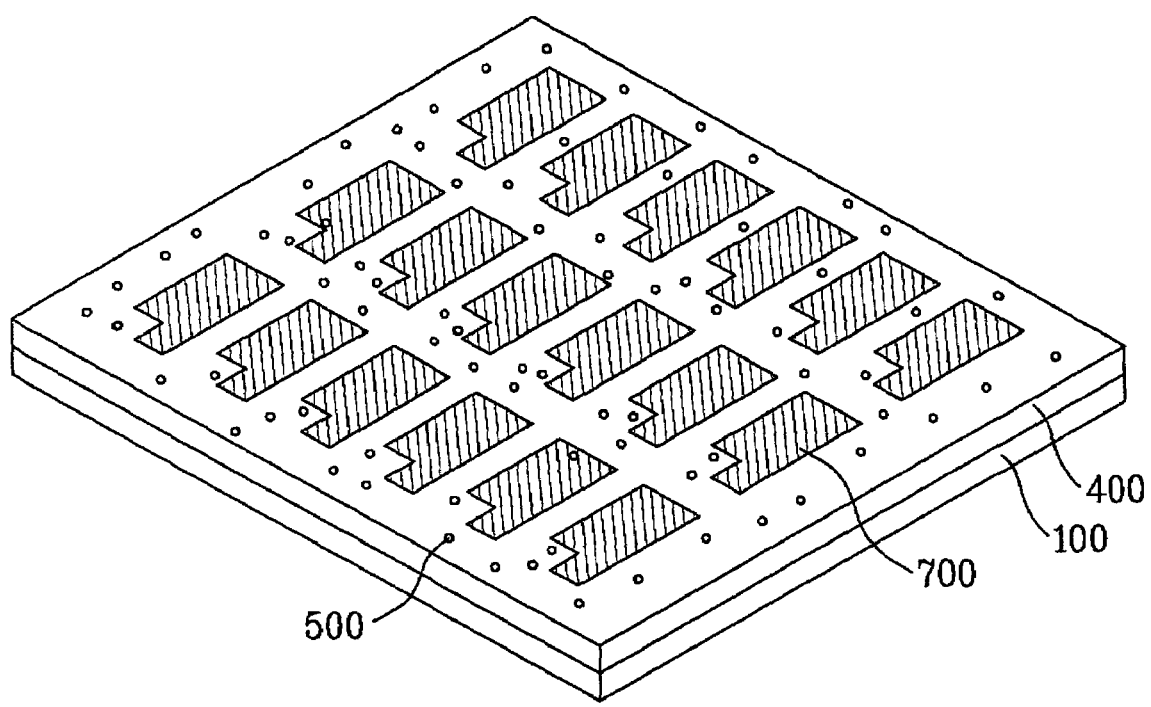

FIGS. 2A to 2C are perspective views of showing a method for forming an LCD device according the preferred embodiment of the present invention.

As shown in FIG. 2A, an ink-jet apparatus 300 provided with a solution containing a black matrix resin and ball spacers is prepared. The ink-jet apparatus 300 is comprised of an ink head (not shown) for storing the solution, and a nozzle (not shown) for dispensing the solution onto a substrate. The black matrix resin forms a black matrix layer on the substrate on which it is deposited. The black matrix layer prevents light leakage in the LCD device. The black matrix resin comprises material commonly known to those skilled in the art.

Then, as shown in FIG. 2B, the solution is coated on a predetermined portion of a substrate 100 by the ink-jet apparatus 300. Accordingly, it is possible to form both the black matrix layer 400 and the ball spacers 500 at the same time. The substrate 100 can be either a thin film transistor substrate, which contains thin film transistors or other switches, or a color filter substrate, which opposes the thin film transistor substrate with the liquid crystal disposed therebetween.

The solution containing the black matrix resin and the ball spacers is coated and dried on the predetermined portion of the substrate 100. By drying the solution, the black matrix resin forms the black matrix layer 400, and the ball spacers 500 is formed in the black matrix layer 400.

The process of coating the solution onto the substrate may be performed by moving the ink-jet apparatus 300 above the substrate 100, or by moving the substrate 100.

The black matrix layer 400 is formed in a non-pixel area of the substrate 100. That is, the ball spacers 500 are formed only in the non-pixel area of the substrate 100 and does not substantially move from the area in which they are deposited.

After that, as shown in FIG. 2C, a color filter layer 700 is formed on the substrate 100 except at regions containing the black matrix layer 400 and the ball spacers 500.

The color filter layer 700 is formed of pigments of red, green and blue. As described above, the color filter layer 700 may be formed after the black matrix layer 400 and the ball spacers 500. However, the color filter layer 700 may be formed before the black matrix layer 400 and the ball spacers 500.

Although not shown, a common electrode or an overcoat layer may be formed on an entire surface of the substrate 100. For a Twisted Nematic (TN) mode LCD device, the common electrode is formed on the entire surface of the substrate 100 since the common electrode is formed on the color filter substrate. For an In-Plane Switching (IPS) mode LCD device, the overcoat layer is formed on the entire surface of the substrate 100 since the common electrode is formed on the thin film transistor substrate.

Although not shown, an alignment layer may be formed on the entire surface of the substrate 100. The alignment layer is formed by coating an alignment material on the substrate 100, and providing a predetermined direction to the coated alignment material.

The above process of coating the alignment material may be performed with the ink-jet apparatus. However, it is not limited to the ink-jet apparatus. For example, the process of coating the alignment material may be formed in a spin coating method or a slit coating method.

Also, the process of providing the predetermined direction to the coated alignment material is performed in a rubbing-alignment method or a photo-alignment method. If using the rubbing-alignment method, the ball spacers may move. In this respect, it is preferable to use the photo-alignment method when using the ball spacers.

If applying the photo-alignment method, the alignment material may be formed of a polyvinylcinnamate (PVCN), polysilioxanecinnamate (PSCN), or cellulosecinnamate (CelCN)-based compound, for example.

Although not shown, a thin film transistor substrate is provided opposite to the substrate 100. Then, a liquid crystal layer is formed between the two substrates, thereby completing the LCD device.

The thin film transistor substrate contains gate and data lines, a thin film transistor, and a pixel electrode. The gate and data lines cross each other on a transparent substrate to define a unit pixel region. The thin film transistor includes a gate electrode, a source electrode, and a data electrode. The thin film transistor is formed adjacent to a crossing area of the gate and data lines. The pixel electrode is formed in the pixel region and is connected with the drain electrode of the thin film transistor. For an IPS mode LCD device, a common electrode is additionally formed in parallel to the pixel electrode. In addition, the color filter can be formed on the thin film transistor substrate in a COT (color filter-on-transistor) or TOC (transistor-on-color filter) arrangement, with the black matrix and ball spacers formed on either the thin film transistor substrate or the substrate opposing the thin film transistor substrate.

The liquid crystal layer may be provided using a dispensing method or an injection method. If the dispensing method is applied, liquid crystal is dispensed on either of the two substrates, and then the two substrates are bonded to each other. If the injection method is applied, after bonding the two substrates with a sealant, liquid crystal is injected to a space between the two substrates by capillary action using the pressure difference between the space (which may be under vacuum) and the external environment.

The elements provided on the substrate may be variable on material and formation method within the scope apparent to those skilled in the art.

In the method of manufacturing the LCD device, the ball spacers and the black matrix resin are coated on the substrate at the same time and the resin dried to form a black matrix layer. Accordingly, the ball spacers are formed only in area covered by the black matrix layer. That is, the ball spacers do not move to a pixel area, thereby improving the picture quality. Although an ink-jet process has been described as the method of coating the substrate, other methods may be used such as those provided above.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of manufacturing an LCD device, the method comprising:
   providing an ink-jet apparatus having a solution containing a black matrix (BM) resin and ball spacers;
   coating the solution on a non-pixel area of a substrate using the ink-jet apparatus;
   drying the solution to simultaneously form a black matrix layer in the non-pixel area and the ball spacers only in area covered by the black matrix layer;
   forming a color filter layer on a pixel area of the substrate;
   forming an alignment layer on an entire surface of the substrate including the black matrix layer and the ball spacers in the non-pixel area and the color filter layer on the pixel area; and providing an alignment direction to the alignment layer on the substrate by performing
a photo-alignment method.

2. The method of claim 1, further comprising:
providing another substrate opposite to the substrate; and
forming a liquid crystal layer.

3. The method of claim 2, wherein providing the other substrate comprises:
forming gate and data lines crossing each other on a transparent substrate, so as to define a unit pixel region;
forming a thin film transistor adjacent to a crossing area of the gate and data lines, the thin film transistor including a gate electrode, a source electrode and a drain electrode; and
forming a pixel electrode connected with the drain electrode of the thin film transistor.

4. The method of claim 2, wherein forming the liquid crystal layer comprises bonding the two substrates to each other after dispensing liquid crystal on one of the two substrates.

5. The method of claim 2, wherein forming the liquid crystal layer comprises injecting liquid crystal to a space between the two substrates after bonding the two substrates to each other.

6. A method of manufacturing an LCD device, the method comprising:
coating a predetermined non-pixel area of a first substrate with a solution containing a black matrix (BM) resin and ball spacers;
drying the solution to simultaneously provide both a black matrix (BM) layer in the non-pixel area and the ball spacers only in area covered by the black matrix layer;
forming a color filter layer on a pixel area of the first substrate;
forming an alignment layer on an entire surface of the first substrate including the black matrix layer and the ball spacers in the non-pixel area and the color filter layer on the pixel area;
providing an alignment direction to the alignment layer on the first substrate by performing a photo-alignment method;
providing a second substrate opposite to the first substrate; and
forming a liquid crystal layer.

7. The method of claim 6, wherein the BM resin is sufficiently thick such that as the BM resin sets, neither the BM resin nor the ball spacers substantially impinge on a pixel area of the first substrate.

8. The method of claim 6, wherein coating the first substrate with the solution comprises dispensing the solution onto the first substrate using an ink-jet apparatus.

9. The method of claim 6, wherein forming the liquid crystal layer comprises bonding the first and second substrates to each other after dispensing liquid crystal on one of the first and second substrates.

10. The method of claim 6, wherein forming the liquid crystal layer comprises injecting liquid crystal to a space between the first and second substrates after bonding the first and second substrates to each other.

11. The method of claim 6, wherein the first substrate is a thin film transistor substrate.

12. The method of claim 6, wherein the first substrate is a color filter substrate.

13. A method of manufacturing an LCD device, the method comprising:
providing an ink-jet apparatus having a solution containing a black matrix (BM) resin and ball spacers;
coating the solution on a non-pixel area of a first substrate using the ink-jet apparatus;
drying the solution to simultaneously form a black matrix layer in a non-pixel area and the ball spacers only in area covered by the black matrix layer;
forming an alignment layer on an entire surface of the first substrate including the black matrix layer and the ball spacers in the non-pixel area of the first substrate; and
providing an alignment direction to the alignment layer on the first substrate by performing a photo-alignment method;
forming a gate line, a data line and a thin film transistor on a second substrate opposite to the first substrate; and
forming a color filter layer on a pixel area of the second substrate.

* * * * *